(12) United States Patent
Kawauchi et al.

(10) Patent No.: US 7,140,251 B2
(45) Date of Patent: Nov. 28, 2006

(54) DEVICES FOR MEASURING PHYSICAL VALUES AND VIBRATORS

(75) Inventors: Osamu Kawauchi, Shiojiri (JP); Yoshio Morita, Chino (JP); Takayuki Kikuchi, Nagoya (JP); Takao Soma, Nishikamo-gun (JP)

(73) Assignees: NGK Insulators, Ltd., Nagoya (JP); Seiko Epson Corporation, Shinjuku-Ku (JP)

( * ) Notice: Subject to any disclaimer, the term of this patent is extended or adjusted under 35 U.S.C. 154(b) by 118 days.

(21) Appl. No.: 10/848,830

(22) Filed: May 19, 2004

(65) Prior Publication Data

US 2005/0257620 A1    Nov. 24, 2005

(51) Int. Cl.
*G01P 9/04* (2006.01)
(52) U.S. Cl. .................. 73/504.16; 73/504.12
(58) Field of Classification Search ............. 73/504.12, 73/504.15, 504.16
See application file for complete search history.

(56) References Cited

U.S. PATENT DOCUMENTS

| | | | | |
|---|---|---|---|---|
| 6,439,051 B1 * | 8/2002 | Kikuchi et al. | .......... | 73/504.12 |
| 6,698,292 B1 * | 3/2004 | Kikuchi | .......... | 73/504.12 |
| 2002/0089386 A1 * | 7/2002 | Kitamura et al. | .......... | 331/158 |
| 2004/0154395 A1 * | 8/2004 | Kikuchi et al. | .......... | 73/503.3 |

FOREIGN PATENT DOCUMENTS

| | | |
|---|---|---|
| JP | 52-52597 A | 4/1977 |
| JP | 02-32229 A | 2/1990 |
| JP | 11-125528 A1 | 5/1999 |
| JP | 2001-221638 | 8/2001 |
| JP | 2001-235331 A1 | 8/2001 |

OTHER PUBLICATIONS

"Handbook of Elastic Wave Device Technologies," (Danseiha-Sosi Gijutsu Handbook) published by Ohm, Inc., pp. 491-497.

* cited by examiner

*Primary Examiner*—John E. Chapman
(74) *Attorney, Agent, or Firm*—Burr & Brown (57) ABSTRACT

A device for measuring a physical value, such as a vibratory gyroscope, is provided. The device comprises a vibrator; a driving means for exciting a driving vibration in the vibrator; a detecting means for obtaining an output signal based on a detection vibration excited in the vibrator in response with the physical value; and a detection circuit for processing the output signal to provide a detection signal corresponding with the physical value. The vibrator has at least one bending vibration arms 1A and 1B vibrating in bending mode along a specified plane (X-Y plane). The bending vibration arm comprises at least a pair of base parts 2A, 2B and a connecting part 3 connecting the base parts 2A, 2B. The connecting and base parts define a pair of recesses 8A, 8B.

12 Claims, 6 Drawing Sheets

DEVICES FOR MEASURING PHYSICAL VALUES AND VIBRATORS

BACKGROUND OF THE INVENTION

1. Field of the Invention

The present invention relates to a device for measuring a physical value and a vibrator.

2. Related Art Statement

A piezoelectric vibratory gyroscope utilizes a Coriolis force, which is generated when an angular movement is applied to a vibrating object in a direction perpendicular to the vibratory direction. Its mechanism is understood by using a dynamic model (For example, see "Handbook of Elastic Wave Device Technologies" (Danseiha-Sosi Gijutsu Handbook) published by Ohm, Inc., pp. 491 to 497).

The assignee has studied various applications of a vibratory gyroscope and has studied to use a vibratory gyroscope as a turning angular rate sensor employed in a vehicle control system of an automobile body based on a vehicle turning rate feedback system. Such a system detects the direction of a steering wheel using a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting wheel torque and steering angle on the basis of this difference.

It is indispensable to detect the turning angular rate at a high precision in such control system. When the detection of turning angular rate at a high precision is tried, however, unnecessary dislocation, or movement, may be easily induced in the bending vibration arm of a vibrator. The unnecessary dislocation may directly contribute to an error in a detection signal from the arm. That is, in a vibratory gyroscope, driving vibration is excited in the driving vibration arm of a vibrator. When the vibrator is then turned, a detection electrode provided on a detection vibration arm detects a detection vibration induced in the vibrator. The thus obtained alternating current output signal is supplied into a detection circuit, and subjected to a process for reducing the effects of the driving vibration as much as possible to finally obtain an output signal corresponding to a turning angular rate. The output signal is normally output as a value of direct current. The unnecessary vibration and dislocation directly affect the measured value of turning angular rate to result in a noise, which is difficult to precisely remove.

The assignee has disclosed the idea of forming an elongate hole in a driving vibration or detection vibration arm of a vibrator, as described in Japanese patent publication 11-125528A. The applicant has tried to provide a through hole in a longitudinal direction of an elongate arm so as to lower the resonant frequency of the arm. It has further tried to provide driving and detection vibration electrodes on the inner wall surfaces facing the through holes to reduce the above described unnecessary dislocation and vibration.

However, the assignee has further studied and found that the magnitude of noise may be increased when a through hole is formed in the driving or detection vibration arm. For example, when a vibratory gyroscope is mounted in an automobile for controlling the direction of a car body of the automobile, the vibratory gyroscope is contained in a housing. The housing needs to be fixed onto the chassis of the car body of the automobile. In this case, an outer vibration (a linear acceleration) is transmitted to the vibrator from the chassis of the car body of the automobile. Such irregular linear acceleration or outer disturbance applied onto the vibratory gyroscope may result in an increase of noise level.

SUMMARY OF THE INVENTION

An object of the present invention is to provide a device for detecting a physical value using a vibrator having a bending vibration arm, to maintain the rigidity of a driving vibration arm at a low value and to reduce a noise level in a detection signal due to a linear acceleration or outer disturbances applied on the vibrator.

A first aspect of the present invention provides a device for measuring a physical value using a vibrator. The device comprises a vibrator having at least one bending vibration arm vibrating in a specified plane in bending mode; a driving means for exciting a driving vibration in the vibrator; a detecting means for obtaining an output signal based on a detection vibration excited in the vibrator in response to the physical value; and a detection circuit for processing the output signal to provide a detection signal corresponding with the physical value. The bending vibration arm comprises at least a pair of base parts and a connecting part connecting the base parts, and the connecting and base parts define a pair of recesses. A ratio "a/b" of the thickness "a" of the connecting part to the thickness "b" of the base part is 0.05 or larger and 0.4 or smaller, and a ratio "d/c" of the width "d" of the recess to the width "c" of the arm is 0.4 or larger and 0.95 or smaller.

A first aspect of the present invention further provides a vibrator for use in measuring a physical value. The vibrator comprises at least one bending vibration arm vibrating in a specified plane in bending mode. The arm comprises at least a pair of base parts and a connecting part connecting the base parts, and the connecting and base parts define a pair of recesses. A detection vibration is excited in the vibrator with response to the physical value when a driving vibration is excited in the vibrator. A ratio "a/b" of the thickness "a" of the connecting part to the thickness "b" of the base part is 0.05 or larger and 0.4 or smaller, and a ratio "d/c" of the width "d" of the recess to the width "c" of the arm is 0.4 or larger and 0.95 or smaller.

A second aspect of the present invention provides a device for measuring a physical value using a vibrator. The device comprises a vibrator comprising a bending vibration arm for driving and a bending vibration arm for detection both vibrating in a specified plane in bending mode; a driving electrode for exciting a driving vibration in the vibrator; a detecting electrode for obtaining an output signal based on a detection vibration excited in the vibrator in response to the physical value; and a detection circuit for processing the output signal to provide a detection signal corresponding with the physical value. Each of the arms comprises at least a pair of base parts and a connecting part connecting the base parts. The connecting and base parts define a pair of recesses. The driving electrode is provided on and detecting electrode is not provided on the arm for driving, and the detecting electrode is provided on and the driving electrode is not provided on the arm for detection.

A second aspect of the present invention further provides a vibrator for use in measuring a physical value. The vibrator comprises a bending vibration arm for driving and a bending vibration arm for detection both vibrating along a specified plane in bending mode. The bending vibration arm comprises at least a pair of base parts and a connecting part connecting the base parts and the connecting and base parts define a pair of recesses. A detection vibration is excited in the vibrator with response to the physical value when a driving vibration is excited in the vibrator. The driving electrode is provided on and the detecting electrode is not provided on the arm for driving, and the detecting electrode is provided on and the driving electrode is not provided on the bending vibration arm for detection.

The inventors have studied a vibrator for driving and detection for use in a device for measuring a physical value, such as a vibratory gyroscope, and having a bending vibration arm vibrating along bending mode in a specified plane. They have thus reached the idea of providing at least pair of base parts opposing with each other and a connecting part connecting the base parts and of defining a pair of recesses with the connecting part and the base parts. The bending vibration arm having such shape is applied in a vibrator for measuring a physical value according to the present invention. It is thus possible to reduce a noise contained in an output signal output from the vibrator when outer disturbances or linear acceleration are applied onto the vibrator. The first and second aspects of the present invention will be described further in detail below, referring to the attached drawings.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 2 (a) is a front view showing arms 1A and 1B of FIG. 1 viewed from the side of a second plane 1d.

FIG. 2 (b) is a front view showing arms 1A and 1B of FIG. 1 viewed from the side of a first plane 1a.

DETAILED DESCRIPTION OF THE INVENTION

Figure 1:
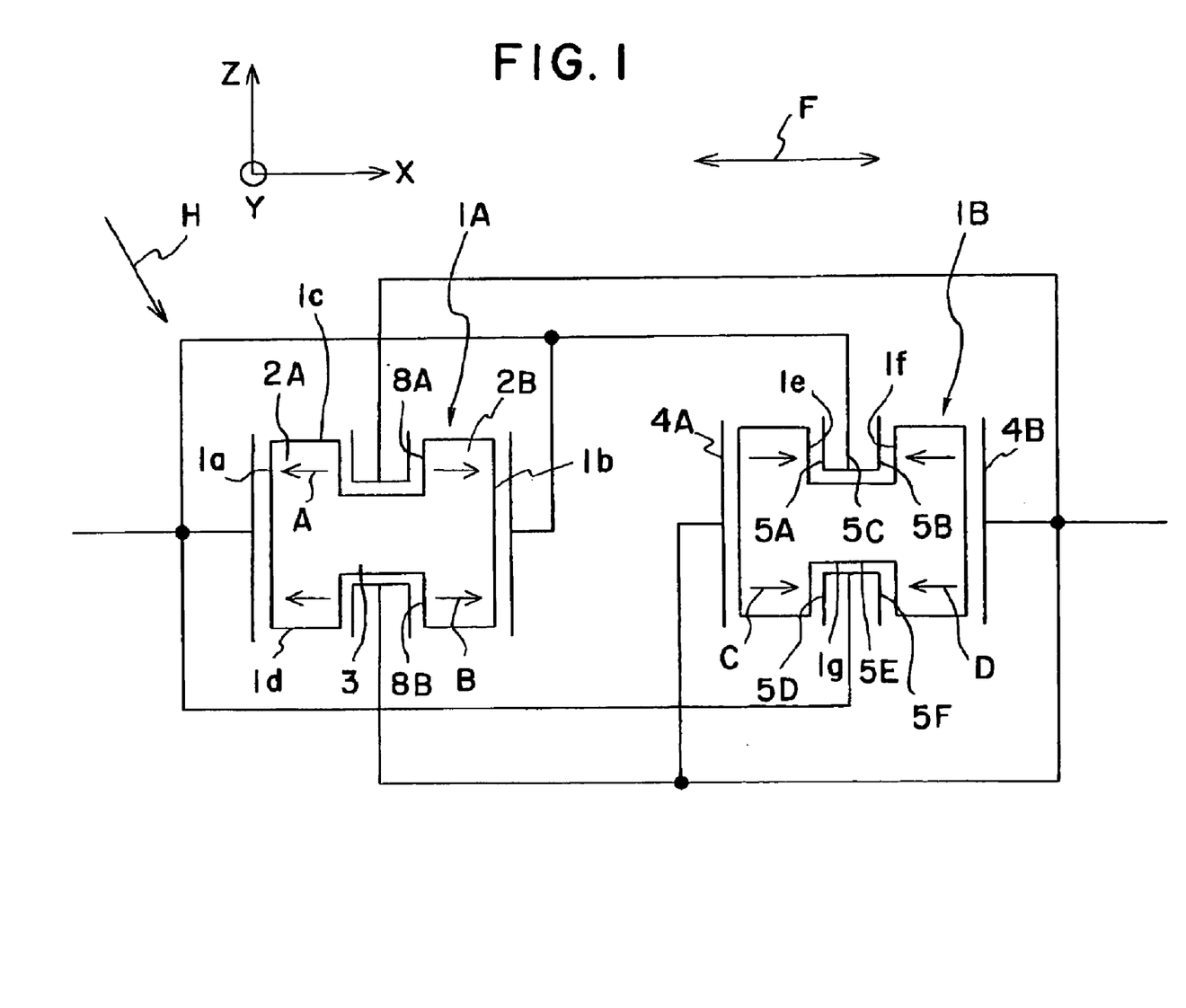
FIG. 1 is a diagram schematically showing the cross sections of driving vibration arms 1A, 1B, according to an embodiment of the present invention.
Figure 2:
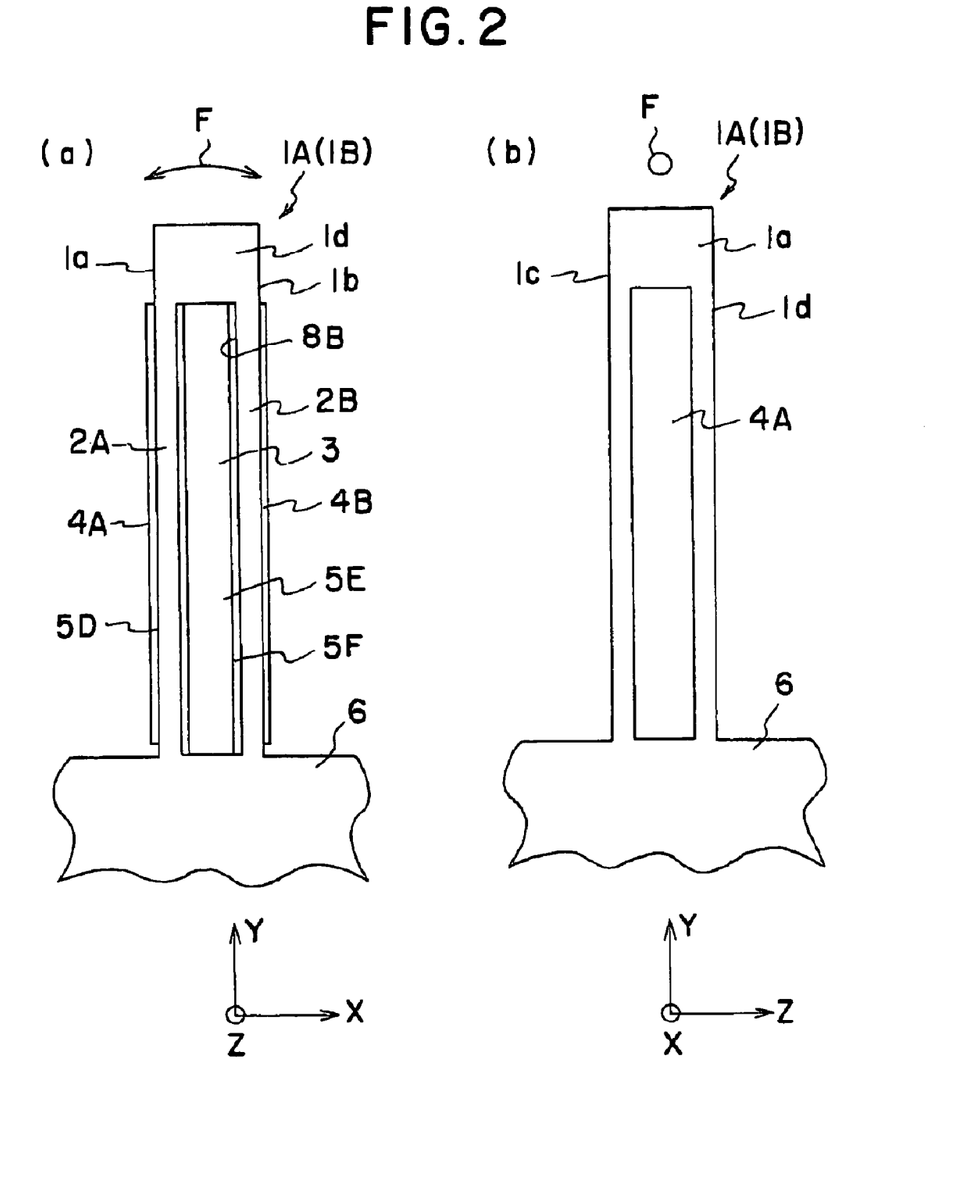

FIG. 1 is a diagram schematically showing a pair of driving vibration arms 1A and 1B of a vibrator according to one embodiment of the present invention. FIG. 2(a) is a front view showing the arms 1A and 1B of FIG. 1 viewed from the side of a second plane 1d, and FIG. 2 (b) is a front view showing the arms 1A and 1B viewed from the side of a first plane 1a.

The arms 1A and 1B have elongate shapes as shown in FIG. 2. The cross section of each arm substantially has a shape of "H" character as shown in FIG. 1. Each arm 1A or 1B is elongated straightforwardly from a specific fixing part 6. Each of the arms 1A and 1B is designed so that each arm vibrates in bending mode in a direction "F" along a specified planes ("X-Y plane" in the present example). Each of the arms 1A and 1B has a pair of first planes 1a and 1b substantially perpendicular to the specified plane and a pair of second planes 1c and 1d substantially parallel with the specified plane. Each of the arms 1A and 1B is composed of a pair of elongate base parts 2A, 2B and a connecting part 3 connecting the base parts 2A and 2B. Each of the base parts 2A, 2B and connecting part 3 has a shape of an elongate flat plate. Recesses 8A and 8B are provided on both sides of the connecting part 3. The recess 8A is formed from the second plane 1c towards the center of the arm, and the recess 8B is formed from the second plane 1d towards the center of the arm.

By applying the driving vibration arm having such shape, the weight of each arm is made lower by the weight of material required for filling the recesses 8A and 8B. The resistance with respect to the vibration in the direction "F" of the arm can be thus reduced so that the resonance frequency can be lowered.

For reducing the resistance against the vibration in the direction "F", it should be generally preferred that the recesses 8A and 8B are connected with each other to form a through hole by deleting the connecting part 3. When the connecting part 3 is not provided, however, each of the base parts 2A and 2B tends to vibrate independently with each other. It is now provided that a linear acceleration is temporarily applied onto the arms 1A and 1B in a direction "H". In this case, the base parts 2A and 2B may be dislocated with response to the outer disturbances to exert influence on the bending vibration of the arm. The outer disturbances and linear acceleration may be applied irregularly in any direction in addition to the direction "H" and the movement tends to be beyond expectations. In is difficult to reduce or cut the noise of the signal when the arm may be easily deformed in response to the irregular and outer disturbances.

On the other hand, according to the present invention, the connecting part 3 connects a pair of the base parts 2A and 2B and functions as a kind of a beam so that the base parts 2A and 2B move as an integral body. The unnecessary dislocation as described above can be thus prevented.

It is further important that the symmetry of the arm with respect to the specified plane (X-Y plane) is improved by providing a pair of recesses 8A and 8B, so as to prevent the dislocation of the arm toward one side of the specified plane. If the recess 8A is provided without forming the recess 8B, the base parts 2A and 2B move as a united body. The dislocation should thus be made smaller compared with an arm having a through hole formed therein. In this case, however, the symmetry of the arm with respect to the specified plane is deteriorated, so that the arm is considerably dislocated toward the side of the recess with respect to the specified plane. Such dislocation may influence adversely on the bending vibration of the vibrator along the specified plane over a long period of time.

Further in the first aspect of the present invention, a ratio "a/b" of the thickness "a" of the connecting part with respect to the thickness "b" of the base part is 0.05 or larger and 0.4 or smaller. Moreover, a ratio "d/c" the width of the recess with respect to the width "c" of the bending vibration arm is 0.4 or larger and 0.95 or smaller.

The ratio "a/b" of the thickness "a" of the connecting part with respect to the thickness "b" of the base part is made 0.4 or smaller, for lowering the resonance frequency of the bending vibration arm. Additionally, the thickness "b" means a distance between a pair of the second planes. The ratio "a/b" may more preferably be 0.2 or lower on the viewpoint. However, the ratio "a/b" is made 0.05 or larger for reducing irregular vibrations such as torsion vibration of the base part when outer disturbances or linear acceleration are applied on the vibrator.

Further, the ratio "d/c" of the width "d" of the recess with respect to the width "c" of the bending vibration arm is made 0.4 or larger, for lowering the resonance frequency of the bending vibration arm. The ratio "d/c" may more preferably be 0.6 or larger. However, the ratio "d/c" is made 0.95 or smaller for reducing irregular vibrations such as torsion vibration of the base part when outer disturbances or linear acceleration are applied on the vibrator.

Further, according to the second aspect of the present invention, the driving electrode is provided on and detecting electrode is not provided on the bending vibration arm for driving. Moreover, the detecting electrode is provided on and driving electrode is not provided on the bending vibration arm for detection.

It is thus possible to reduce irregular vibrations such as torsion vibration of the base part when outer disturbances or linear acceleration are applied on the vibrator, so that the detection noise can be reduced.

Figure 3:
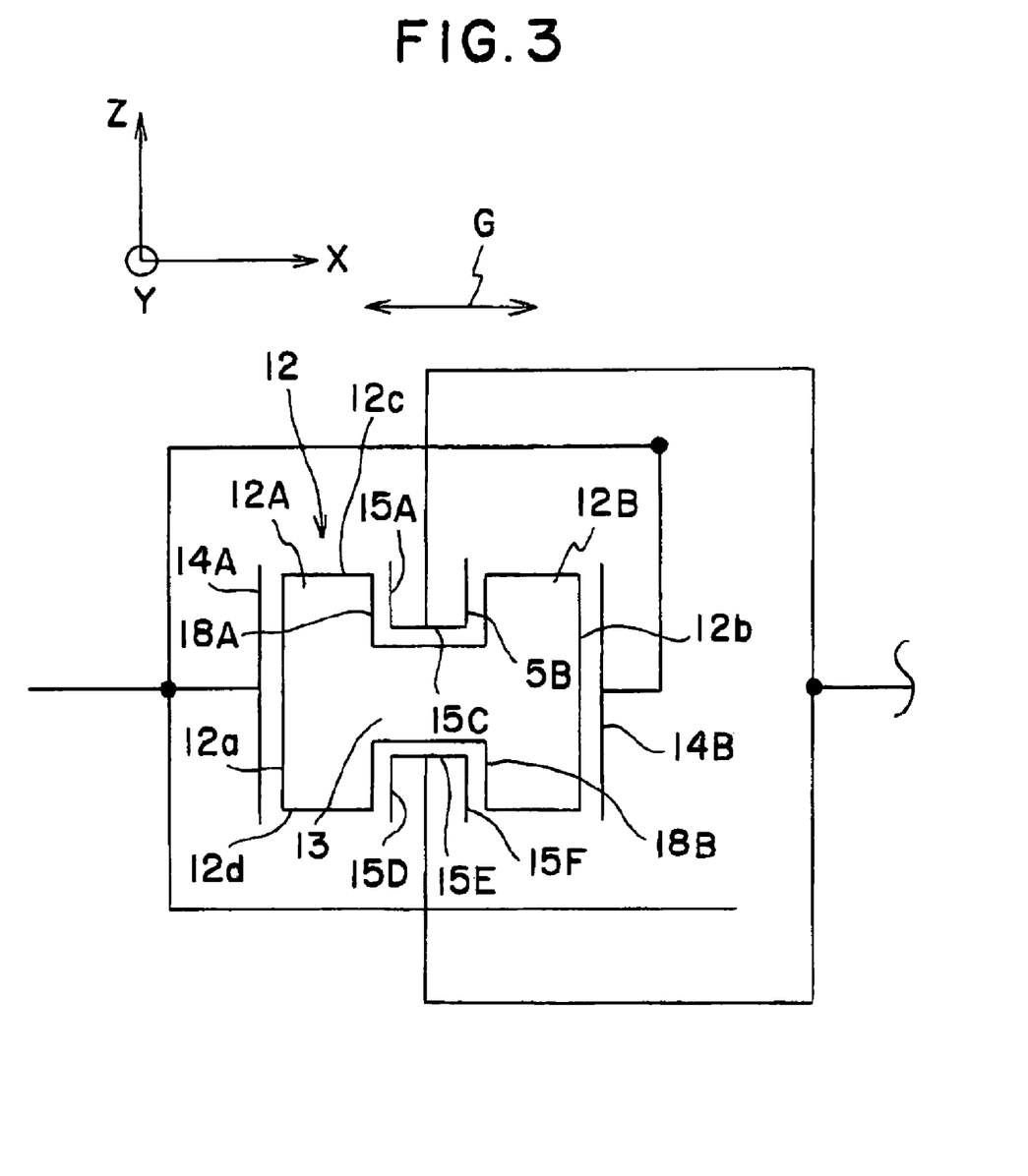
FIG. 3 is a diagram schematically showing the cross sectional shape of a detection vibration arm 12 according to another embodiment of the present invention.

Further, as shown in FIG. 3, the first and second aspects of the present invention may be advantageously applied to a bending vibration arm with the detecting means provided thereon. The arm 12 has an elongate shape as is shown in FIG. 2. The arm substantially has a cross sectional shape of a character of "H". The arm 12 is designed so that the arm vibrates in bending mode in a direction "G" along the specified plane (X-Y plane in the present example). The vibration is detected by the detecting means as detection vibration. The arm 12 has a pair of first planes 12a and 12b substantially perpendicular to the specified plane, and a pair of second planes 12c and 12d substantially parallel with the specified plane.

The arm 12 has a pair of elongate base parts 12A and 12B and a connecting part 13 connecting the base parts 12A and 12B. Each of the base parts 12A, 12B and connecting part 13 has a shape of an elongate flat plate. Recesses 18A and 18B are provided on both sides of the connecting part 13. The recess 18A is formed from the second plane 12c towards the center of the arm, and the recess 18B is formed from the second plane 12d towards the center of the arm.

In the detection vibration arm, it is also possible to reduce unnecessary vibration and dislocation when outer disturbances or irregular linear acceleration are applied on the vibrator, as described above. Particularly when an unnecessary dislocation of vibration that is asymmetrical with respect to the specified plane is induced in the detection vibration arm, the corresponding signal is directly interposed on a true output signal. The present invention is particularly useful when applied to a detection vibration arm.

In a preferred embodiment, the driving means is provided on at least one bending vibration piece.

In a preferred embodiment, the detecting means is provided on at least one bending vibration piece.

In a preferred embodiment, the bending vibration arm has a pair of first planes substantially perpendicular to the specified plane and a pair of second planes substantially parallel with the specified plane and the recesses are provided on the side of the second planes. Such shape is exemplified in FIGS. 1 and 3.

In a preferred embodiment, the driving means includes a first driving electrode provided on the first plane, and a second driving electrode provided on the inner wall surface facing the recess and opposing the first driving electrode.

This embodiment will be described, referring to FIGS. 1 and 2. According to the present example, the first electrodes 4A and 4B are formed on the first planes 1a and 1b, respectively. Second electrodes 5A, 5B, 5D and 5F are formed on the inner wall surfaces 1e and 1f facing the recesses 8A, and 8B, respectively. The second electrodes 5A and 5D oppose a first electrode 4A and the second electrodes 5B and 5F oppose a first electrode 4B.

A conductive film 5C is formed on one surface 1g of the connecting part 3. The conductive film 5C is connected with electrodes 5A and 5B to supply electric power to the electrodes 5A and 5B. A conductive film 5E is formed on the other surface 1g of the connecting part 3. The conductive film 5E is connected with electrodes 5D and 5F to supply electric power to the electrodes 5D and 5F.

In the present example, the arms 1A and 1B are vibrated in bending motion, so that the phase of vibration in the arm 1A is made an inverse phase from the phase of vibration in the arm 1B. That is, first electrodes 4A and 4B on the arm 1A and second electrodes 5A, 5B, 5D and 5F on the arm 1B are electrically connected at the same potential, and second electrodes 5A, 5B, 5D and 5F on the arm 1A and second electrodes 4A and 4B on the arm 1B are electrically connected at the same potential. It is now provided that the vibrator is made of a piezoelectric material polarizing in the direction "F". At this stage, an alternating current voltage is applied on the base parts 2A and 2B as arrows "A", "B", "C" and "D". The phase of the voltage on the side of the base part 2A is made an inverse phase with respect to the phase on the side of base part 2B, so that the dislocation of the base part 2A is made inverse phase with respect to that of the base part 2B. That is, when the base part 2A is elongated at a specific moment, the base part 2B is shrunk at the same time. When the base part 2A is elongated, the base part 2B is elongated at the same time. As a result, the arms 1A and 1B vibrate in bending motion in the direction "F". Further, the dislocation of vibration of the arm 1A and dislocation of the vibration of the arm 1B are of the inverse phase.

Further in a preferred embodiment, as shown in FIG. 3, the detecting means has first detecting electrodes 14A, 14B provided on first planes 12a and 12b, respectively, and second detecting electrodes 15A, 15B, 15D and 15F provided on the inner wall surfaces facing the recesses 18A and 18B, respectively. The first detecting electrodes 14A, 14B oppose the second detecting electrodes 15A, 15B, 15D and 15F, respectively. A conductive film 15C is connected with the electrodes 15A and 15B to supply electric power to the electrodes 15A and 15B. A conductive film 15E is connected with electrodes 15D and 15F to supply electric power to the electrodes 15D and 15F.

In a detection vibration arm 12 shown in FIG. 3, the first electrodes 14A and 14B are electrically connected with each other at the same potential, and the second electrodes 15A, 15B, 15D and 15F are electrically connected with each other at the same potential. It is now provided that the arm 12 is made of a piezoelectric material polarizing in the direction "G". At this stage, when the arm 12 is vibrated in bending motion in the direction "G", an alternating current is generated between the first and second electrodes. The current is drawn as an output signal. The signal is subjected to a predetermined processing in a detection circuit to obtain a detection signal corresponding to a physical value.

A physical value measured according to the first and second aspects of the present invention is not particularly limited. When a driving vibration is excited in a vibrator and the vibration state of the vibrator is changed due to the effects of a specific physical value exerted on the vibrator, the physical value is included in the present invention as far as the physical value can be detected through a detection circuit. Such physical value may preferably be an acceleration, an angular acceleration or an angular velocity applied on a vibrator. The measuring system of the present invention may preferably be an inertia censor.

In a preferred embodiment, the vibrator is made of a piezoelectric material and preferably a piezoelectric single crystal.

The piezoelectric single crystal may more preferably be selected from the group consisting of quartz, lithium niobate, lithium tantalite, lithium niobate-lithium tantalite solid solution, lithium borate and langasite. A 130° Y-plate of lithium niobate, lithium tantalite or lithium niobate-lithium tantalite solid solution is most preferred.

Figure 4:
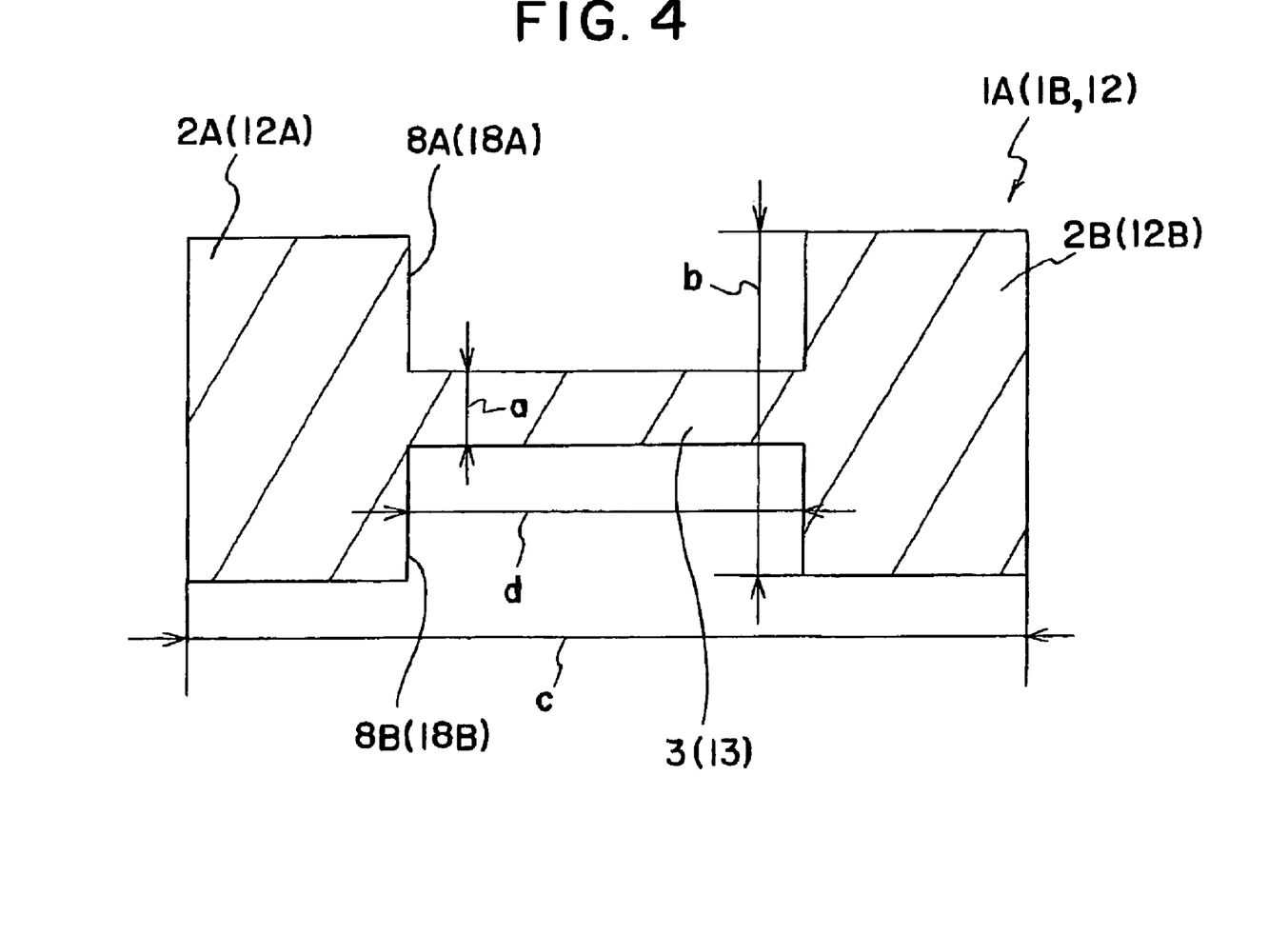
FIG. 4 is a diagram schematically showing the cross section of a detection vibration arm 12 according to a still another embodiment of the present invention.

Examples of the design of each part of the bending vibration arm according to the present invention will be described, referring to FIG. 4. FIG. 4 is a cross sectional view schematically showing a bending vibration arm.

The ratio "a/b" of the thickness "a" of the connecting part with respect to the thickness "b" of the base part is made 0.4 or smaller, for lowering the resonance frequency of the bending vibration arm. Additionally, the thickness "b" means a distance between a pair of the second planes. The ratio "a/b" may more preferably be 0.2 or lower on the viewpoint. However, the ratio "a/b" is made 0.05 or larger for reducing irregular vibrations such as torsion vibration of the base part when outer disturbances or linear acceleration are applied on the arm.

Further, the ratio "d/c" of the width "d" of the recess with respect to the width "c" of the bending vibration arm is made 0.4 or larger, for lowering the resonance frequency of the bending vibration arm. The ratio "d/c" may more preferably be 0.6 or larger. However, the ratio "d/c" is made 0.95 or smaller for reducing irregular vibrations such as torsion vibration of the base part when outer disturbances or linear acceleration are applied on the arm.

Figure 5:
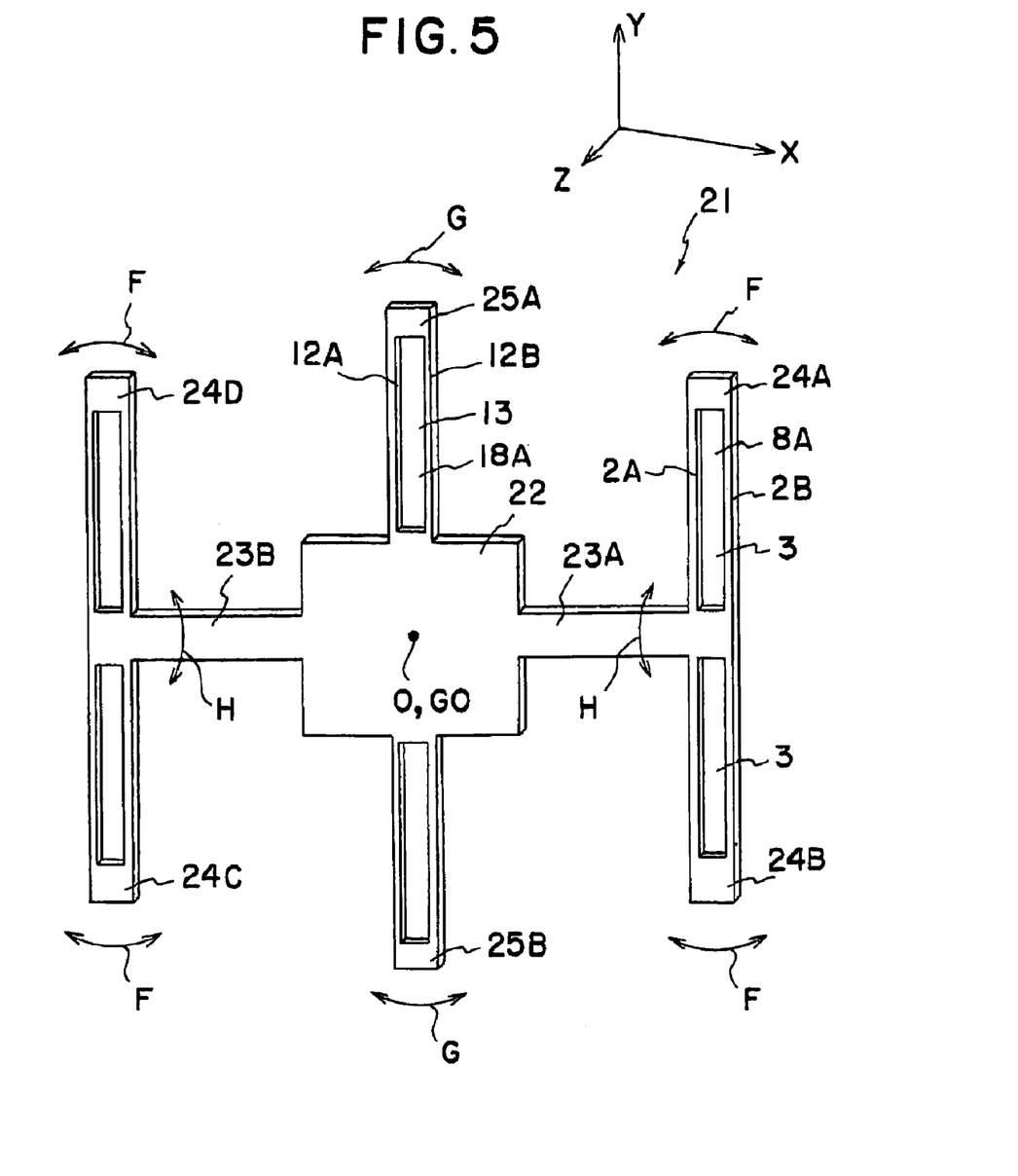
FIG. 5 is a perspective view showing an example of the present invention.

The first and second aspects of the present invention may be preferably applied to a horizontal setting type vibratory gyroscope. In a horizontal setting type vibratory gyroscope, a vibrator is elongated along a specified plane substantially perpendicular to a rotating axis. Particularly preferable in this case, both of the driving and detection vibration arms vibrate along the specified plane. FIG. 5 shows a vibrator 21 according to this embodiment of the present invention.

The vibrator 21 has a base portion 22 and supporting portions 23A and 23B protruding from the base portion 22. Bending vibration arms (driving vibration arms) 24A, 24B, 24C and 24D are protruded from the supporting portions 23A and 23B at the tip ends of the supporting portions in a direction perpendicular to the supporting portion. Each of the bending vibration arms has cross sectional and front shapes substantially same as those shown in FIGS. 1 and 2. Further, in FIG. 5, driving and detecting electrodes are not shown for the ease of understanding the construction and shape of the vibrator. An alternating current voltage is applied onto the driving vibration arms 24A to 24D, as described above, so that the arms are vibrated in the direction "F" along the X-Y plane.

Further, elongate bending vibration arms 25A and 25B vibrating circumferentially are protruded from the peripheral part of the base portion 22. Each of the arms 25A and 25B has a shape shown in FIG. 3.

When each of the driving vibration arms is vibrated in the direction "F" and the vibrator 21 is turned around a Z-axis, a pair of supporting portions 23A and 23B are vibrated in the direction "H" in a bending vibration mode around the roots of the supporting portions to the base portion. Responsive to this, the detection vibration arms 25A and 25B are vibrated in the direction "G" in bending vibration mode around the roots of the arms to the base portion. A detection signal is generated based on the bending vibration and then processed in a detection circuit.

Figure 6:
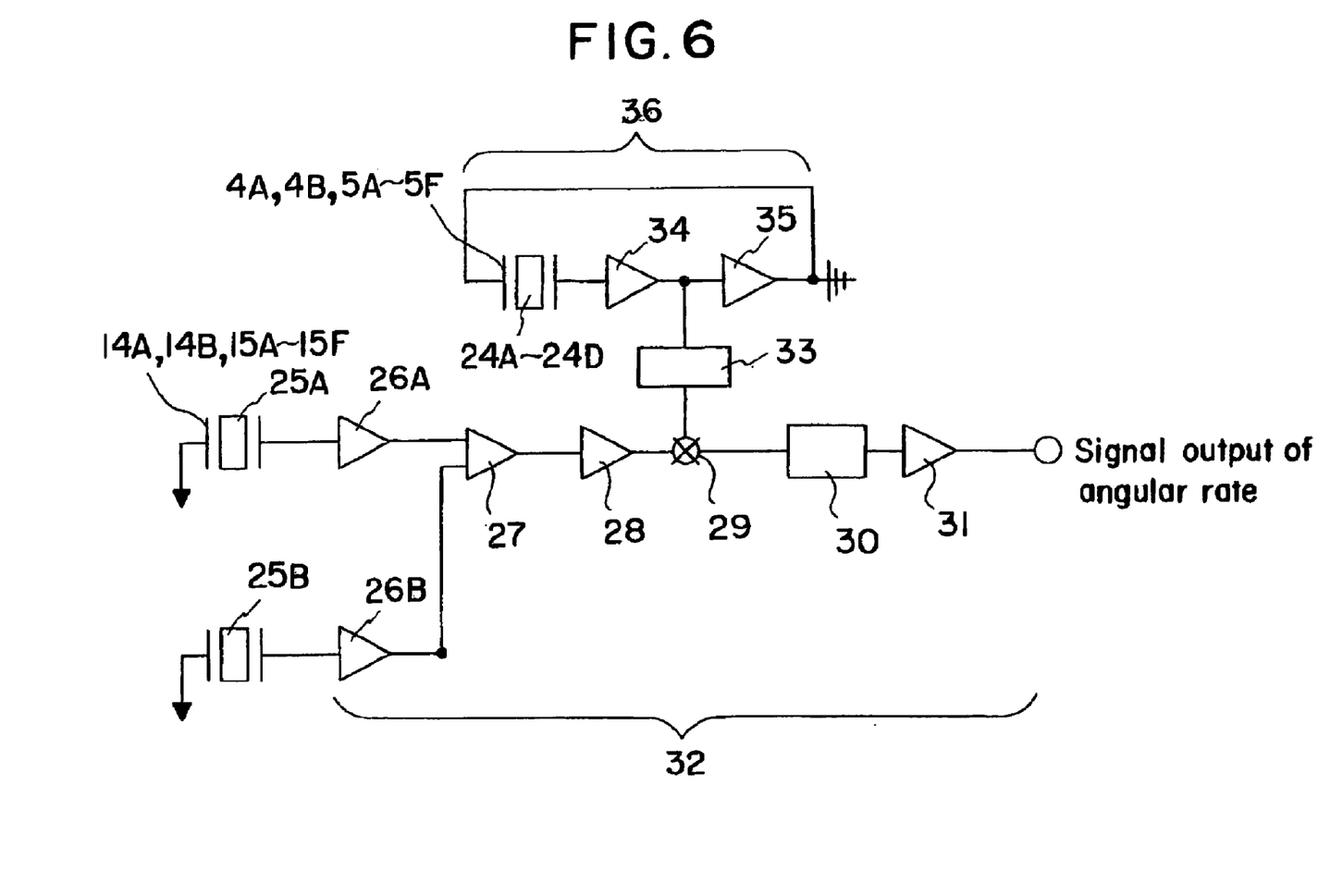
FIG. 6 is a block diagram showing an example of a vibratory gyroscope according to the present invention.

FIG. 6 is a block diagram showing an example of driving and detection circuits according to the present embodiment. The vibrator 21 of the present embodiment has driving electrodes 4A, 4B, 5A, 5B, 5D and 5F and detecting electrodes 14A and 14B. 24A to 24D represent driving vibration arms and 25A and 25B represent detection vibration arms.

The driving electrodes are connected with an outer self-oscillation circuit 36. When the operation is initiated, a noise is input from an activating circuit to the self-oscillation circuit 36. The noise is subjected to frequency selection and then input into an alternating current amplifier 34 for amplification. A part of the output signal is drawn from the alternating current amplifier and then input into a rectifier so that the signal is converted to a level (magnitude) of the amplitude. The signal of the amplitude level is input into an amplifier 35 for controlling the amplitude.

A detecting circuit 32 is a circuit for processing the output signal from the vibrator and to draw a true detection signal. Output signals from the detection electrodes 14A, 14B, 15A, 15B, 15D and 15F of the vibrator are amplified using preset amplifiers 26A and 26B, respectively. Each of the outputs from the amplifiers 26A and 26B includes at least a true detection signal corresponding to the turning angular rate. In the present example, the detection signals included in the output signals are of inverse phases with each other. The output signals are input into a subtracter 27 for subtraction to cancel the influences of the driving vibration to leave a true detection signal. The output of the subtracter 27 is then input into an alternating current amplifier 28, detector 29, low path filter 30 and limiter 31 to obtain a true detection signal from the terminal.

In the detector 29, a shifted signal based on the driving signal is used to detect the output signal. Specifically, a part of a driving signal is derived and the thus derived signal is supplied to a phase shifter 33 to obtain the derived and shifted signal. The phase of the shifted signal is different from that of the derived signal by a predetermined angle, for example, 90°. The shifted signal is input into a detector 29 to detect the output signal from the vibrator. As a result, unnecessary leakage signal is cancelled in the output signal after the phase detection. The output signal after the phase detection is input into a smoothing circuit and the output is amplified.

The present invention has been explained referring to the preferred embodiments, however, the present invention is not limited to the illustrated embodiments which are given by way of examples only, and may be carried out in various modes without departing from the scope of the invention.

For example, the shapes of the base part and recesses are not particularly limited. Further, the direction of polarization of the piezoelectric material in the base part, and the positions and shapes of the driving and detection electrodes on the vibration arm are not limited.

As described above, the present invention provides a device for detecting a physical value using a vibrator having a bending vibration arm, to maintain the rigidity of the arm at a low level and to reduce a noise level in a detection signal due to a linear acceleration or outer disturbances applied on the vibrator.

The invention claimed is:

1. A device for measuring a physical value using a vibrator: said device comprising;
   a vibrator comprising at least one bending vibration arm for driving and at least one bending vibration arm for detection, both vibrating along a specified plane in bending mode;
   a driving electrode for exciting a driving vibration in said vibrator;
   a detecting electrode for obtaining an output signal based on a detection vibration excited in said vibrator in response to said physical value; and
   a detection circuit for processing said output signal to provide a detection signal corresponding with said physical value,
   wherein each of said bending vibration arms comprises at least a pair of base parts and a connecting part connecting said base parts, and said connecting and base parts define a pair of recesses,
   wherein said driving electrode is provided on and said detecting electrode is not provided on said bending vibration arm for driving and said detecting electrode is provided on and said driving electrode is not provided on said bending vibration arm for detection,
   wherein a ratio "a/b" of the thickness "a" of said connecting part to the thickness "b" of said base part is 0.05 or larger and 0.4 or smaller and a ratio "d/c" of the width "d" of said recess to the width "c" of said bending vibration arm is 0.4 or larger and 0.95 or smaller; and
   wherein each of said bending vibration arm for driving and said bending vibration arm for detection comprises a pair of first planes substantially perpendicular to said specified plane and a pair of second planes substantially parallel with said specified plane, and wherein said recesses are provided on the sides of said second planes, respectively.

2. The device of claim 1, wherein said driving electrode is provided on the surface of said vibrator.

3. The device of claim 1, wherein said driving electrode comprises a first driving electrode provided on said first plane, and a second driving electrode provided on a wall surface facing said recess so that said second driving electrode opposes said first driving electrode.

4. The device of claim 1, wherein said detecting electrode is provided on the surface of said vibrator.

5. The device of claim 1, wherein said detecting electrode comprises a first detecting electrode provided on said first plane and a second detecting electrode provided on a wall surface facing said recess so that said second detecting electrode opposes said first detecting electrode.

6. The device of claim 1, comprising an inertia sensor.

7. A vibrator for use in measuring a physical value, said vibrator comprising at least one bending vibration arm for driving and at least one bending vibration arm for detection, both vibrating along a specified plane in bending mode, wherein each of said bending vibration arms comprises at least a pair of base parts and a connecting part connecting said base parts, and said connecting and base parts define a pair of recesses, wherein a detection vibration is excited in said vibrator with response to said physical value when a driving vibration is excited in said vibrator, wherein a driving electrode is provided on and a detecting electrode is not provided on said bending vibration arm for driving and said detecting electrode is provided on and said driving electrode is not provided on said bending vibration arm for detection, wherein a ratio "a/b" of the thickness "a" of said connecting part to the thickness "b" of said base part being 0.05 or larger and 0.4 or smaller and a ratio "d/c" of the width "d" of said recess to the width "c" of said bending vibration arm being 0.4 or larger and 0.95 or smaller; and
   wherein each of said bending vibration arm for driving and said bending vibration arm for detection comprises a pair of first planes substantial perpendicular to said specified plane and a pair of second planes substantially parallel with said specified plane and wherein said recesses are provided on the sides of said second planes, respectively.

8. The vibrator of claim 7, comprising a piezoelectric material.

9. The vibrator of claim 8, wherein said piezoelectric material is selected from the group consisting of quartz, lithium niobate, lithium tantalate, lithium niobate-lithium tantalate solid solution, lithium borate and langasite.

10. The vibrator of claim 8, wherein said piezoelectric material is polarized in an axis of piezoelectricity substantially parallel with said specified plane.

11. The vibrator of claim 7, wherein said driving electrode comprises a first electrode provided on said first plane and a second electrode provided on a wall surface facing said recess so that said second electrode opposes said first electrode.

12. The vibrator of claim 7, wherein said detecting electrode comprises a first electrode provided on said first plane and a second electrode provided on a wall surface facing said recess so that said second electrode opposes said first electrode.

* * * * *